United States Patent
Travaglini et al.

(10) Patent No.: US 12,205,579 B2
(45) Date of Patent: *Jan. 21, 2025

(54) SYSTEMS AND METHODS FOR DYNAMICALLY UPDATING MACHINE LEARNING MODELS THAT PROVIDE CONVERSATIONAL RESPONSES

(71) Applicant: Capital One Services, LLC, McLean, VA (US)

(72) Inventors: Tate Travaglini, New York, NY (US); Andrew Oestreicher, Washington, DC (US); Victor Alvarez Miranda, McLean, VA (US); Parag Jain, Falls Church, VA (US); Rui Zhang, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,482

(22) Filed: Oct. 18, 2023

(65) Prior Publication Data

US 2024/0046922 A1 Feb. 8, 2024

Related U.S. Application Data

(63) Continuation of application No. 18/169,162, filed on Feb. 14, 2023, now Pat. No. 11,798,540, which is a continuation of application No. 17/193,774, filed on Mar. 5, 2021, now Pat. No. 11,605,375.

(51) Int. Cl.
*G10L 15/22* (2006.01)
*G06F 40/30* (2020.01)
*G10L 15/065* (2013.01)
*G10L 15/18* (2013.01)
*G06F 40/35* (2020.01)
*G10L 15/16* (2006.01)
*G10L 15/183* (2013.01)

(52) U.S. Cl.
CPC .......... *G10L 15/1822* (2013.01); *G06F 40/30* (2020.01); *G10L 15/065* (2013.01); *G10L 15/1815* (2013.01); *G10L 15/22* (2013.01); *G06F 40/35* (2020.01); *G10L 15/16* (2013.01); *G10L 15/18* (2013.01); *G10L 15/183* (2013.01); *G10L 2015/221* (2013.01); *G10L 2015/223* (2013.01); *G10L 2015/227* (2013.01)

(58) Field of Classification Search
None
See application file for complete search history.

(56) References Cited

U.S. PATENT DOCUMENTS

| | | | |
|---|---|---|---|
| 9,742,912 B2 * | 8/2017 | Srivastava | H04M 3/4936 |
| 9,922,642 B2 * | 3/2018 | Pitschel | G10L 15/063 |
| 10,216,832 B2 * | 2/2019 | Bangalore | G06F 16/3329 |

(Continued)

*Primary Examiner* — Richard Z Zhu
(74) *Attorney, Agent, or Firm* — Foley & Lardner LLP (57) ABSTRACT

Methods and systems for dynamically updating machine learning models that provide conversational responses through the use of a configuration file that defines modifications and changes to the machine learning model are disclosed. For example, the configuration file may be used to define an expected behavior and required attributes for instituting modifications and changes (e.g., via a mutation algorithm) to the machine learning model.

20 Claims, 6 Drawing Sheets

(56) References Cited

U.S. PATENT DOCUMENTS

| | | | |
|---|---|---|---|
| 10,540,971 B2* | 1/2020 | Kumar | H04L 12/1827 |
| 10,546,574 B2* | 1/2020 | Kim | G10L 15/14 |
| 11,217,230 B2* | 1/2022 | Iwase | G10L 25/78 |
| 11,270,074 B2* | 3/2022 | Iwase | G10L 15/30 |
| 11,631,017 B2* | 4/2023 | White | G06N 5/043 |
| | | | 706/49 |
| 2005/0105712 A1* | 5/2005 | Williams | G10L 13/027 |
| | | | 704/275 |
| 2015/0039292 A1* | 2/2015 | Suleman | G06F 3/16 |
| | | | 704/9 |
| 2018/0061394 A1* | 3/2018 | Kim | G10L 15/02 |
| 2018/0174578 A1* | 6/2018 | Bangalore | G06F 40/137 |
| 2019/0189117 A1* | 6/2019 | Kumar | G06F 16/3329 |
| 2020/0082214 A1* | 3/2020 | Salammagari | G06N 3/006 |
| 2020/0151253 A1* | 5/2020 | Wohlwend | G06N 3/044 |
| 2020/0320381 A1* | 10/2020 | Venkatraman | G06Q 10/067 |
| 2021/0082422 A1* | 3/2021 | Mondal | G10L 15/22 |
| 2021/0104245 A1* | 4/2021 | Aguilar Alas | G10L 15/16 |
| 2021/0224066 A1* | 7/2021 | Iwase | G06F 16/383 |
| 2022/0108175 A1* | 4/2022 | Lyske | G06N 3/084 |

* cited by examiner

```
{
  "cohortId" : 1,
  "quick_replies" : [
    {
      "count" : 4,
      "algorithm" : "MachineLearningModel1",
      "mutation_algorithms" : [
        {
          "quick_replies" : ["Example_QR1", "Example_QR2"],
          "params" : {
            "max_replacements" : 1
          },
          "mutation_algorithm" : "ConfidenceThresholdReplacement"
        }
      ]
    }
  ]
}
```

SYSTEMS AND METHODS FOR DYNAMICALLY UPDATING MACHINE LEARNING MODELS THAT PROVIDE CONVERSATIONAL RESPONSES

CROSS-REFERENCE TO RELATED APPLICATIONS

This application is a continuation of U.S. patent application Ser. No. 18/169,162, filed Feb. 14, 2023, which is a continuation of U.S. patent application Ser. No. 17/193,774, filed Mar. 5, 2021. The content of the foregoing application is incorporated herein in its entirety by reference.

TECHNICAL FIELD

The invention relates to dynamically updating machine learning models that provide conversational responses.

BACKGROUND

In recent years, the amount and uses of interactive programs has risen considerably. In tandem with this rise is the need to have human-like interactions and/or create applications that mimic the tone, cadence, and speech patterns of humans. Additionally, in order to fulfill user-interaction requirements, these applications need to be helpful, and thus respond intelligently by providing relevant responses to user inputs, whether these inputs are received via text, audio, or video input.

SUMMARY

Methods and systems are described herein for generating dynamic conversational responses. Conversational responses include communications between a user and a system that may maintain a conversational tone, cadence, or speech pattern of a human during an interactive exchange between the user and the system. The interactive exchange may include the system responding to one or more user actions (which may include user inactions) and/or predicting responses prior to receiving a user action. In order to maintain the conversational interaction during the exchange, the system may advantageously generate responses that are both timely and pertinent (e.g., in a dynamic fashion). This requires the system to determine both quickly (e.g., in real-time or near real-time) and accurately the intent, goal, or motivation behind a user input. These user input or actions may take various forms including speech commands, textual inputs, responses to system queries, and/or other user actions (e.g., logging into a mobile application of the system). In each case, the system may aggregate information about the user action, information about the user, and/or other circumstances related to the user action (e.g., time of day, previous user actions, current account settings, etc.) in order to determine a likely intent of the user.

In order to determine the likely intent and generate a dynamic conversational response that is both timely and pertinent, the methods and systems herein may use one or more machine learning models. For example, the methods and systems disclosed herein may use a machine learning model to both quickly and accurately determine an intent of the user. However, the use of a machine learning model to determine the intent of a user has certain technical drawbacks.

Specifically, while machine learning models are able to generate dynamic conversational responses (e.g., text corresponding to an option aligned with the intent of the user) for an initial set of categories (e.g., potential intents of a user), the machine learning model must be trained to identify that a user has a given intent. This training process may involve copious amounts of training data (e.g., sets of user data that is labeled with known intents) and numerous mathematical iterations as the machine learning model learns how to categorize inputted user data into the labeled intents. For example, aggregated information about the user action, information about the user, and/or other circumstances related to the user action (e.g., time of day, previous user actions, current account settings, etc.) may be used to generate a feature input (e.g., a vector of data) that expresses the information quantitatively or qualitatively. However, feature inputs for similar intents (e.g., a first intent of a user to learn his/her maximum credit limit and a second intent of a user to learn a current amount in his/her bank account) may have similar feature inputs as much of the underlying aggregated information may be the same. Accordingly, determining a specific intent of a user, with a high level of precision may require large amounts of labeled training data and long amounts of time for the machine learning model to learn how to categorize inputted user data.

To further complicate the technical hurdles, some forms of machine learning may be unsupervised meaning that the creators of the machine learning model may not know how exactly the machine learning model has learned (e.g., what weights, bias, etc. the machine learning model has applied to different user data) to categorize user data into the different intents. For example, the machine learning model may have detected previously unknown patterns in user data that indicate when a user has a particular intent. Moreover, these patterns may be expressed in such a mathematically complex way that a user may not be able to conceptualize what the pattern is or how to find a similar pattern. This presents a problem, however, when the machine learning model must be updated to reflect new intents (e.g., potential intents of users are added or deleted), available user data is changed (e.g., categories, types, and/or formats of user data are added, deleted, and/or otherwise modified), and/or the desired goals of the machine learning model are changed (e.g., the goals of the machine learning model are expanded to include predicting content that is of interest to a user that may not have been the specific intent of the user).

Conventional solutions to these technical hurdles included the use of "hard-coding" substitution and modification rules into the machine learning model. However, these hard-coded rules have a number of downsides resulting from their need to be implemented ahead of time and without full knowledge of what changes will need to be made. For example, these hard-coded rules as they are more brittle to other code changes, they are slower to implement, they are less responsive to changing needs of the machine learning model, and they are more prone to errors.

In contrast to the conventional solution, and to overcome the aforementioned technical challenges, methods and systems are disclosed herein for dynamically updating machine learning models that provide conversational responses through the use of a configuration file that defines modifications and changes to the machine learning model. For example, the configuration file may be used to define an expected behavior and required attributes for instituting modifications and changes (e.g., via a mutation algorithm) to the machine learning model. Additionally or alternatively, the modifications and changes (e.g., via a mutation algorithm) are not strictly limited to using a static configuration file for defining those modifications and changes as the system may also implement a dynamic configuration integration file. For example, the dynamic configuration integration may be implemented by storing the configuration information within a database. In order to update the configurable attributes for the required attributes for instituting modifications and changes (e.g., via a mutation algorithm), the system may update the appropriate record within the database. The updated records may be pulled from the database and used when running the machine learning model. For example, by storing the configuration information within a dynamic system such as a database instead of in a static file, the system may more quickly change the expected behavior of the machine learning model.

In some aspects, the methods and systems are disclosed for dynamically updating machine learning models that provide conversational responses. For example, the system may receive a user action, at a user interface, during a conversational interaction with a user interface. The system may determine a feature input based on the user action in response to receiving the user action. The system may input the feature input into a machine learning model, wherein the machine learning model may be trained to determine respective confidence levels for a plurality of specific intents, and wherein each of the respective confidence levels indicates a likelihood that a user has a corresponding specific intent. The system may receive an output from the machine learning model, the output comprising the respective confidence levels for each of the plurality of specific intents. The system may compare each of the respective confidence levels to a threshold confidence level. The system may retrieve a configuration file based on comparing each of the respective confidence levels to a threshold confidence level, wherein the configuration file comprises a modification to rules used to select specific intents. The system may select a specific intent based on the configuration file, wherein the specific intent corresponds to a dynamic conversational response. The system may generate for display, at the user interface, the dynamic conversational response during the conversational interaction.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (e.g., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
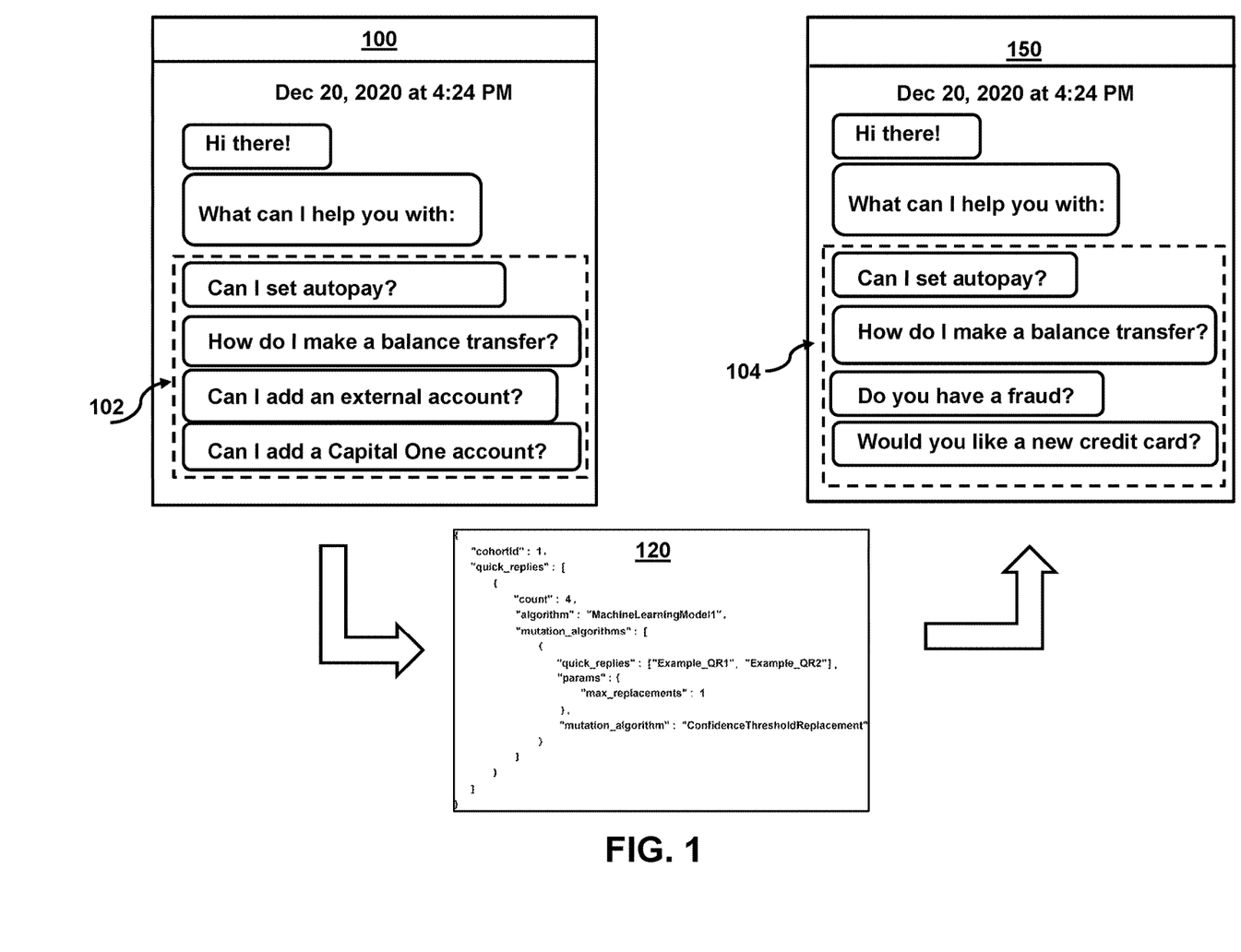
FIG. 1 shows an illustrative user interface being dynamically updated based on a configuration file, in accordance with one or more embodiments.

FIG. 1 shows an illustrative user interface being dynamically updated based on a configuration file, in accordance with one or more embodiments. For example, FIG. 1 shows user interface 100. The system (e.g., a mobile application) may generate and respond to user interactions in a user interface (e.g., user interface 100) in order to engage in a conversational interaction with the user. The conversational interaction may include a back-and-forth exchange of ideas and information between the system and the user. The conversational interaction may proceed through one or more mediums (e.g., text, video, audio, etc.). For example, user interface 100 may be powered by a recommendation engine component that suggests questions that a user may ask when beginning a conversation. These suggestions may be referred to as dynamic conversational responses. These dynamic conversational responses may be generated by the system using a variety of methods, such as by using a machine learning model, predetermined/default selections, and/or by randomly selecting dynamic conversational responses.

In order to maintain the conversational interaction, the system may need to generate response (e.g., conversational response) dynamically and/or in substantially real-time (e.g., using a machine learning model such as model 300 (FIG. 3)). For example, the system may generate responses within the normal cadence of a conversation. In some embodiments, the system may continually determine a likely intent of the user in order to generate responses (e.g., in the form of prompts, notifications, and/or other communications) to the user. It should be noted that a response may include any step or action (or inaction) taken by the system, including computer processes, which may or may not be perceivable to a user.

For example, in response to a user action, which in some embodiments may comprise a user logging onto an application that generates user interface 100, selecting a conversational response (e.g., conversational response 102) in user interface 100, and/or a prior action (or lack thereof) by a user to a prior response generated by the system, the system may take one or more steps to generate dynamic conversational responses (e.g., conversational responses 102). These steps may include retrieving data about the user, retrieving data from other sources, monitoring user actions, and/or other steps in order to generate a feature input (e.g., as discussed herein).

User interface 100 may represent conversational responses that are generated by a machine learning model prior to any modification of its rules (e.g., via a mutation algorithm introduced by a configuration file). In contrast, user interface 150 may represent a user interface after a configuration file (e.g., configuration file 120) has introduced a modification to the rules of the machine learning model used to select specific intents. For example, as shown in user interface 150 the conversational responses (e.g., conversational responses 104) have now been updated. In some embodiments, configuration file 120 may correspond to configuration file 400 (FIG. 4)). Furthermore, the system may retrieve configuration file 120 based on the techniques discussed in FIGS. 5-6 herein.

For example, the system may determine a confidence level for each of dynamic conversational responses 102. The system may retrieve (and/or execute instructions in) a configuration file based on comparing each of the respective confidence levels to the threshold confidence level (e.g., a threshold confidence level indicative of a minimum likelihood of a user's actual intent. Dynamic conversational responses 102 may represent a subset of predicted specific intents (e.g., a top five most likely intents). However, the system may determine that a confidence level of a predicted specific intent of the subset of predicted specific intents is below the threshold confidence level (e.g., despite this specific intent being in the top five most likely it is still unlikely to be indicative of the user's actual intent). The system may retrieve a substitute specific intent from the configuration file based on determining that the confidence level of the predicted specific intent of the subset of predicted specific intents is below the threshold confidence level, wherein selecting the dynamic conversational response based on the configuration file comprises selecting the substitute specific intent. For example, in response to determine that some specific intents are unlikely to match a user's actual intent, the system may replace these specific intents with advertisements or dynamic conversational responses associated with other business goals.

For example, the system may need add-in dynamic conversational responses, remove dynamic conversational responses, re-order dynamic conversational responses, modifying display characteristics (e.g., how long a dynamic conversational response is shown, the text of a dynamic conversational response, the font size of a dynamic conversational response, an audio cue or tactile sensation generated when the dynamic conversational response is selected, etc.), and/or change the order of the dynamic conversational responses. The system may perform this modification based on a predetermined schedule, a random schedule, and/or in response to a received trigger. For example, the system may determine to perform the modification when a user meets certain criteria. In such cases, the system may replaces dynamic conversational responses from recommendation algorithm outputs (e.g., based on a machine learning model) with other defined dynamic conversational responses when certain criteria are met for a user (e.g., when a user action and/or other user data meets one or more criteria).

In some embodiments, the system may select a configuration file from a plurality of configuration files based on the user data. For example, the system may store numerous configuration files, each of which provides an expected behavior for the machine learning model (e.g., selects a specific intent for the user), and/or provides specific dynamic conversational response. The system may select these configuration files based on current circumstances and/or based on characteristics of a user. For example, the system may create configuration files that each define a respective expected behavior of the machine learning model (e.g., provides a predetermined predicted specific intent). The system may further divide potential users into a series of groups or cohorts, where each cohort may include a group of users with varying attributes such as a demographic, information about a local device used to access the system (e.g., system requirements, data formats, operating systems, screen size, etc.), geographic/temporal region, etc.

Additionally or alternatively, the configuration file may be specific to a particular recommendation engine (e.g., machine learning model) in use. For example, for each cohort, the configuration file (e.g., configuration file 120) may first determine which recommendation algorithm (e.g., the machine learning model) applies for users in this cohort. The configuration file can define the modifications to the recommendation algorithm (e.g., the mutation algorithms) that apply for this recommendation algorithm and for this cohort of users. Alternatively, the system may perform a series of initial queries to determine the current recommendation engine (e.g., machine learning algorithm) and select a configuration file that includes the desired modifications to a recommendation algorithm.

Figure 2:
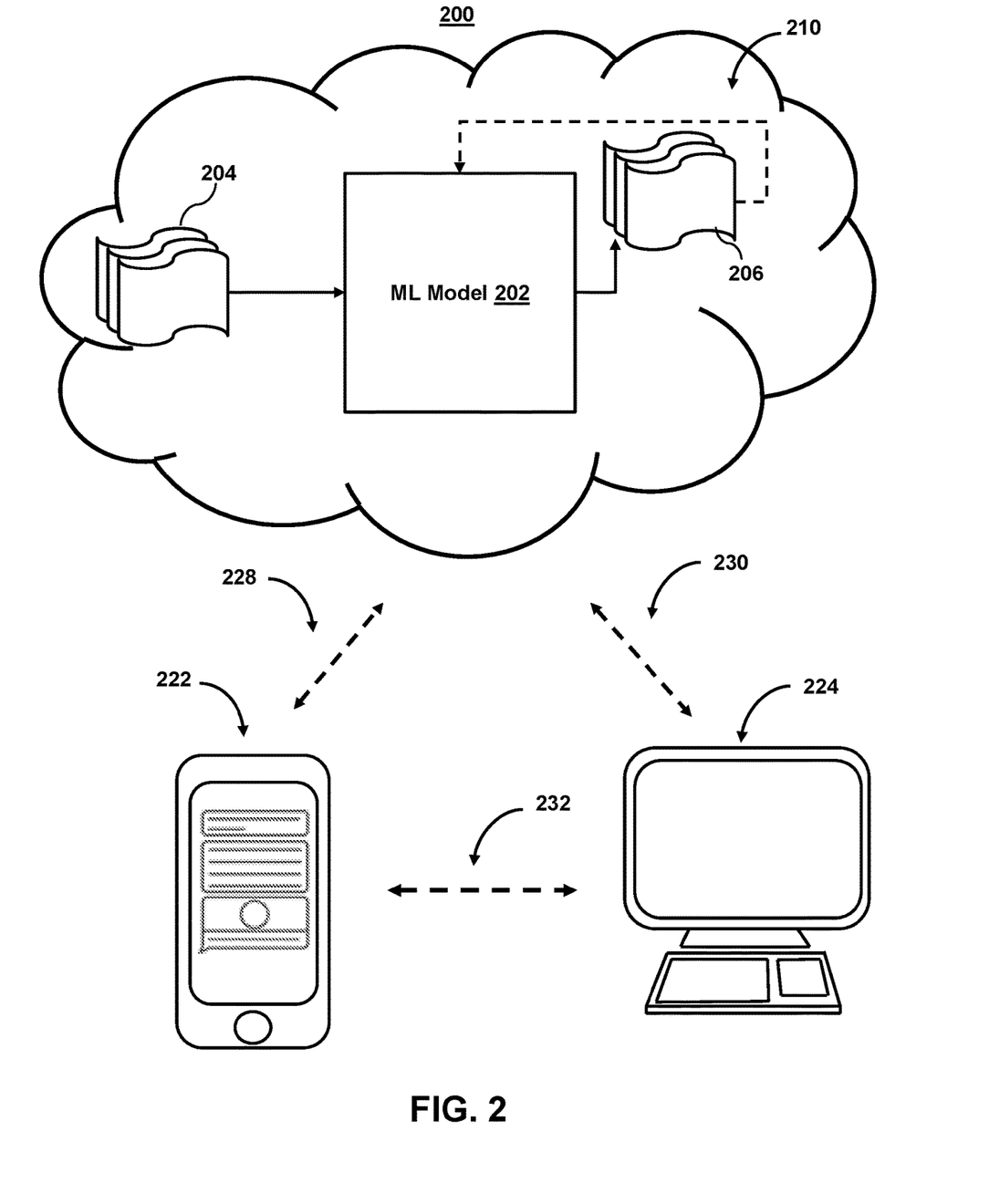
FIG. 2 is an illustrative system for dynamically updating machine learning models that provide conversational responses, in accordance with one or more embodiments.

FIG. 2 is an illustrative system for dynamically updating machine learning models that provide conversational responses, in accordance with one or more embodiments. For example, system 200 may represent the components used for generating dynamic conversational responses as shown in FIG. 1. As shown in FIG. 2, system 200 may include mobile device 222 and user terminal 224. While shown as a smartphone and personal computer, respectively, in FIG. 2, it should be noted that mobile device 222 and user terminal 224 may be any computing device, including, but not limited to, a laptop computer, a tablet computer, a hand-held computer, other computer equipment (e.g., a server), including "smart," wireless, wearable, and/or mobile devices. FIG. 2 also includes cloud components 210. Cloud components 210 may alternatively be any computing device as described herein and may include any type of mobile terminal, fixed terminal, or other device. For example, cloud components 210 may be implemented as a cloud computing system and may feature one or more component devices. It should also be noted that system 200 is not limited to three devices. Users may, for instance, utilize one or more other devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of mobile device 222, those operations may, in some embodiments, be performed by components of cloud components 210. In some embodiments, the various computers and systems described herein may include one or more computing devices that are programmed to perform the described functions. Additionally or alternatively, multiple users may interact with system 200 and/or one or more components of system 200. For example, in one embodiment, a first user and a second user may interact with system 200 using two different components.

With respect to the components of mobile device 222, user terminal 224, and cloud components 210, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 2, both mobile device 222 and user terminal 224 include a display upon which to display data (e.g., based on a predicted intent of a user).

Additionally, as mobile device 222 and user terminal 224 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 200 may run an application (or another suitable program). The application may cause the processors and/or control circuitry to perform operations related to generating dynamic conversational responses using a machine learning model.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes communication paths 228, 230, and 232. Communication paths 228, 230, and 232 may include the Internet, a mobile phone network, a mobile voice or data network (e.g., a 5G or LTE network), a cable network, a public switched telephone network, or other types of communications networks or combinations of communications networks. Communication paths 228, 230, and 232 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 210 may be a database configured to store user data for a user. For example, the database may include user data that the system has collected about the user through prior transactions. Alternatively, or additionally, the system may act as a clearing house for multiple sources of information about the user. Cloud components 210 may also include control circuitry configured to perform the various operations needed to determine user intents and generate dynamic conversational responses based on the determined user intents. For example, the cloud components 210 may include cloud-based storage circuitry configured to store a machine learning model, wherein the machine learning model may be trained to determine respective confidence levels for a plurality of specific intents, and wherein each of the respective confidence levels indicates a likelihood that a user has a corresponding specific intent. Cloud components 210 may also include cloud-based control circuitry configured to determine an intent of the user, retrieve a configuration file, wherein the configuration file comprises a modification to rules used to select specific intents, and select a specific intent based on the configuration file. Cloud components 210 may also include cloud-based input/output circuitry configured to generate the dynamic conversational response during the conversational interaction.

Cloud components 210 includes machine learning model 202. Machine learning model 202 may take inputs 204 and provide outputs 206. The inputs may include multiple datasets such as a training dataset and a test dataset. Each of the plurality of datasets (e.g., inputs 204) may include data subsets related to user data, contact strategies, and results. In some embodiments, outputs 206 may be fed back to machine learning model 202 as input to train machine learning model 202 (e.g., alone or in conjunction with user indications of the accuracy of outputs 206, labels associated with the inputs, or with other reference feedback information). In another embodiment, machine learning model 202 may update its configurations (e.g., weights, biases, or other parameters) based on the assessment of its prediction (e.g., outputs 206) and reference feedback information (e.g., user indication of accuracy, reference labels, or other information). In another embodiment, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Figure 3:
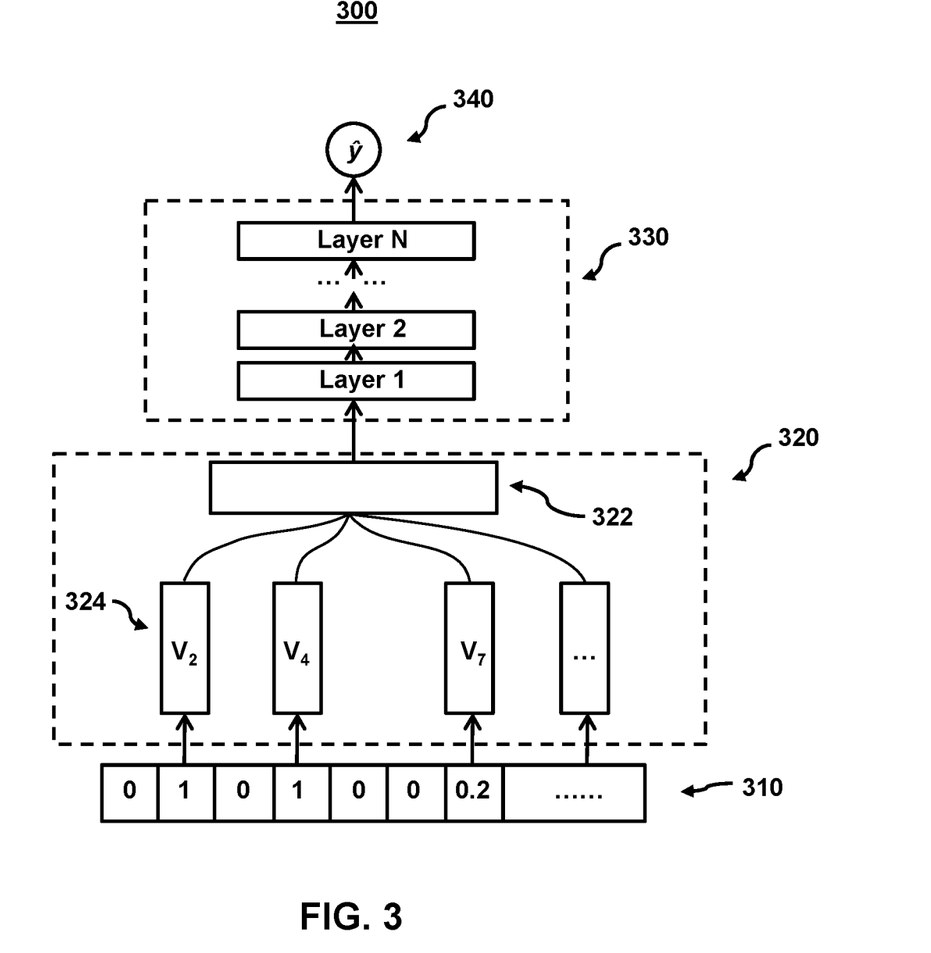
FIG. 3 is an illustrative model architecture a machine learning model for determining specific intents of a user based on user actions, in accordance with one or more embodiments.

In some embodiments, machine learning model 202 may include an artificial neural network (e.g., as described in FIG. 3 herein). In such embodiments, machine learning model 202 may include an input layer and one or more hidden layers. Each neural unit of machine learning model 202 may be connected with many other neural units of machine learning model 202. Such connections can be enforcing or inhibitory in their effect on the activation state of connected neural units. In some embodiments, each individual neural unit may have a summation function which combines the values of some or all of its inputs together. In some embodiments, each connection (or the neural unit itself) may have a threshold function such that the signal must surpass before it propagates to other neural units. Machine learning model 202 may be self-learning and trained, rather than explicitly programmed, and can perform significantly better in certain areas of problem solving, as compared to traditional computer programs. During training, an output layer of machine learning model 202 may correspond to a classification of machine learning model 202 and an input known to correspond to that classification may be input into an input layer of machine learning model 202 during training. During testing, an input without a known classification may be input into the input layer, and a determined classification may be output.

In some embodiments, machine learning model 202 may include multiple layers (e.g., where a signal path traverses from front layers to back layers). In some embodiments, back propagation techniques may be utilized by machine learning model 202 where forward stimulation may be used to reset weights on the "front" neural units. In some embodiments, stimulation and inhibition for machine learning model 202 may be more free-flowing, with connections interacting in a more chaotic and complex fashion. During testing, an output layer of machine learning model 202 may indicate whether or not a given input corresponds to a classification of machine learning model 202 (e.g., whether a user has a given specific intent based on a feature input).

FIG. 3 is an illustrative model architecture a machine learning model for determining specific intents of a user based on user actions, in accordance with one or more embodiments. One tier of the multi-tiered machine learning model may include an artificial neural network (e.g., model 330) and another tier may include a factorization machine model (e.g., model 320). In some embodiments, a first machine learning model (e.g., model 320) is a supervised machine learning model and a second machine learning model (e.g., model 330) is an unsupervised machine learning model. It should be noted that alternatively, the first machine learning model (e.g., model 320) may be either a supervised or unsupervised machine learning model and/or the second machine learning model (e.g., model 330) may be a supervised or unsupervised machine learning model.

In some embodiments, model 300 may predict a goal or intent of a user. This goal or intent may be selected from a plurality of goals and/or intents stored by the system. For example, the system may goals/intents based on similar characteristics of the users. For example, the system may determine that users who ask different questions about payment have similar account information and digital activities. The system may further determine that the users tend to be different from those of users who have a one-off type request, such as lost card reports or travel notification.

In some embodiments, the model (e.g., model 300) may automatically perform actions based on output 340. In some embodiments, the model (e.g., model 300) may not perform any actions on a user's account, rather the output of the model (e.g., model 300) may be only used to decide which dynamic conversational responses display to a user.

Model 320 may be structured as a factorization machine model. Model 320 may be a non-linear model and/or supervised learning model that can perform both classification and regression. Model 320 may perform these tasks by measuring interactions between variables within large datasets. In some embodiments, model 320 may be used to determine intent clusters for a feature input (e.g., feature input 310). For example, model 320 may be a general-purpose supervised learning algorithm that the system uses for both classification and regression tasks. It may be an extension of a linear model that is designed to capture interactions between features within high dimensional sparse datasets economically. For example, factorization machine models are extensions of linear models which model the interactions of variables. They map and plot their interactions to a lower dimension. As a result, the number of parameters extends linearly through the dimensions.

Beneficially, model 320 may estimate parameters under very sparse data and therefore scale to fit large datasets. This may be particularly useful for the user account and user action data as this data may be highly correlated and sparse. Moreover, model 320 may not rely on training data, resulting in more compact models. In some embodiments, the features of the training data (e.g., used for model 330), can be derived from model 320. Therefore, model 320 may serve a dual purpose. Additionally, model 320 (as a factorization machine) may work with any real-valued feature vector, whereas other factorization models may require special input data.

In some embodiments, the feature input may include a vector that describes various information about a user, a user action (which may include user inactions), and/or a current or previous interaction with the user. The system may further select the information for inclusion in the feature input based on a predictive value. The information may be collected actively or passively by the system and compiled into a user profile.

In some embodiments, the information (e.g., a user action) may include conversation details such as information about a current session, including a channel or platform, e.g. desktop web, iOS, mobile, a launch page (e.g., the webpage that the application was launched from), a time of launch, activities in a current or previous session before launching the application. The system may store this information and all the data about a conversational interaction may be available in real-time via HTTP messages and/or through data streaming from more or more sources (e.g., via an application programming interface (API)).

In some embodiments, the information (e.g., a user action) may include user account information such as types of accounts the user has, other accounts on file such as bank accounts for payment, information associated with accounts such as credit limit, current balance, due date, recent payments, recent transactions. The system may obtain this data in real-time for model prediction through enterprise APIs In some embodiments, the information (e.g., a user action) may include insights about users, provided to the application (e.g., via an API) from one or more sources such as a qualitative or quantitative representations (e.g., a percent) of a given activity (e.g., online spending) in a given time period (e.g., six months), upcoming actions (e.g., travel departure, pay day, leave and/or family event) for a user, information about third parties (e.g., merchants (ranked by the number of transactions) over the last year for the user), etc.

Model 320 may include embedding layers 324 at which each feature of the vector of feature input 310 may be converted into a dense vector representation. These dense vector representations for each feature are pooled at layer 322 to convert the set of embedding vectors into a single vector. The created vector may be used as an input for model 330. The output from the first machine learning model may be input into a second machine learning model (or second tier). For example, the output may comprise the feature input, a determination of an intent cluster, and/or a specific model (or algorithm) for use in the second tier.

Model 330 may be structured as an artificial neural network. Model 330 may include one or more hidden layers. Model 330 may be based on a large collection of neural units (or artificial neurons). Model 330 loosely mimics the manner in which a biological brain works (e.g., via large clusters of biological neurons connected by axons). Each neural unit of a model 330 may be connected with many other neural units of model 330. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Model 330 may be self-learning and trained, rather than explicitly programmed, and can perform significantly better in certain areas of problem solving, as compared to traditional computer programs.

During training, output 340 may correspond to a classification of model 330 (e.g., a specific intent) and an input known to correspond to that classification may be input into model 330 from model 320. In some embodiments, model 330 may include multiple layers (e.g., where a signal path traverses from front layers to back layers). In some embodiments, back propagation techniques may be utilized by model 330 where forward stimulation may be used to reset weights on the "front" neural units. In some embodiments, stimulation and inhibition for model 330 may be more free-flowing, with connections interacting in a more chaotic and complex fashion. During testing, output 340 may indicate whether or not a given input corresponds to a classification of model 330 (e.g., whether or not a given output of model 320 corresponds to a specific intent).

Figure 4:
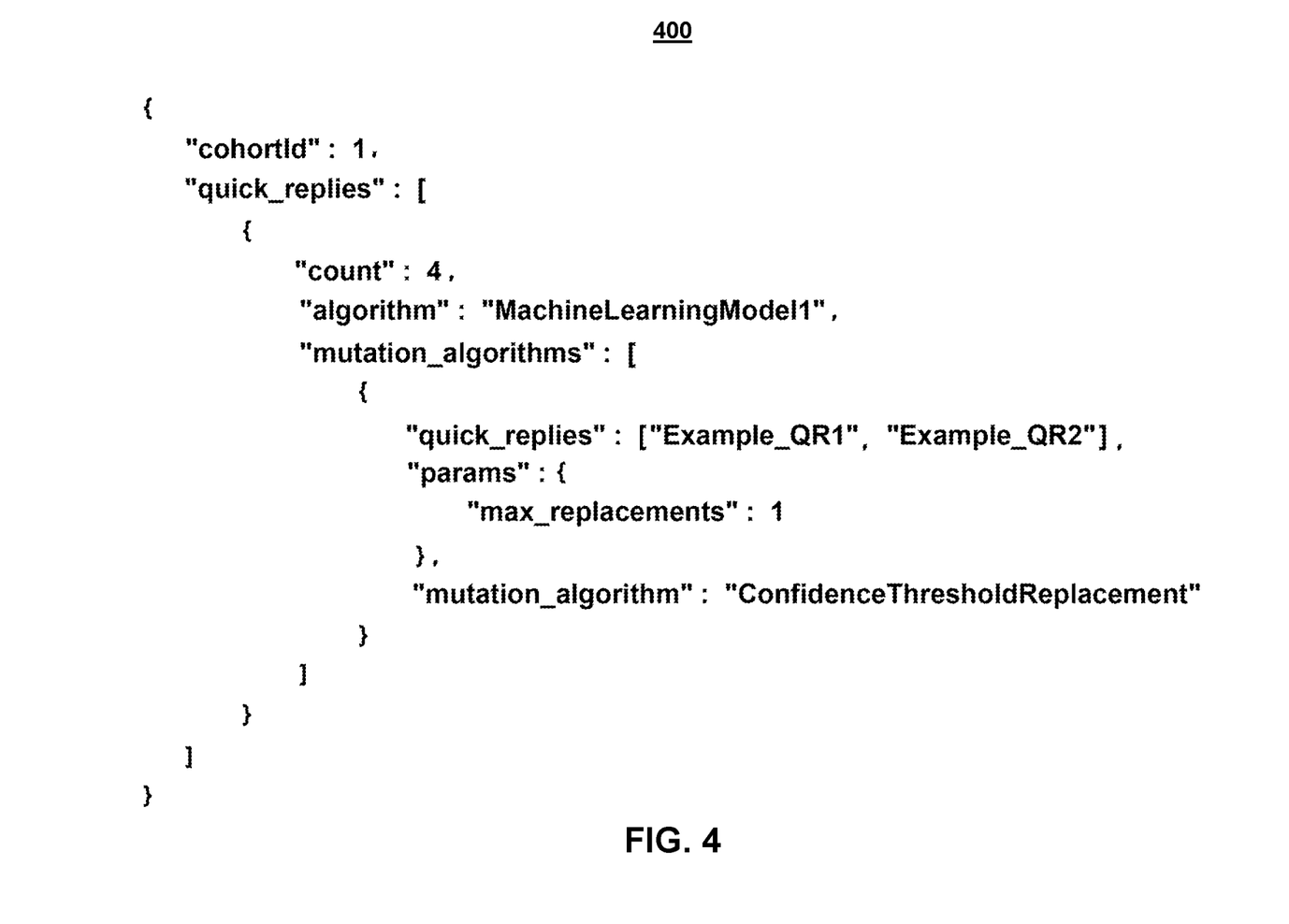
FIG. 4 is an illustrative pseudocode for a configuration file, in accordance with one or more embodiments.

FIG. 4 is an illustrative pseudocode for a configuration file, in accordance with one or more embodiments. For example, configuration file 400 may correspond to configuration file 120 (FIG. 1) and may be retrieved as described herein in relation to FIGS. 5-6. Configuration file 400 may include several lines of code, which may comprise rules for modifying a machine learning model.

The first line of code (e.g., "cohortID" as shown in configuration file 400) may include an identifier for a specific user data. For example, the system may detect an identifier of the modifications (e.g., which rules in a configuration file and/or which mutation algorithm) should be applied for a given user based on detected user data (e.g., the user belonging to a given cohort). The system may retrieve this user data as part of a user profile and/or based on one or more user actions.

The modifications may determine how a list of dynamic conversational responses should be substituted into the dynamic conversational responses that would be generated by the current recommendation algorithm. For example, the configuration file may include a tag (e.g., "quick replies" as shown in configuration file 400) that indicates that the configuration file will apply modifications to the dynamic conversational responses and/or the dynamic conversational response for substitution. The configuration file may include a tag that determine which dynamic conversational response is to be modified (e.g., the fourth dynamic conversational response by the tag "'count': 4" as shown in configuration file 400). Additionally or alternatively, the tag "count" may refer to a number of quick replies that should be returned to a user from a machine learning model (e.g., "MachineLearningModel1"). For example, the count tag may indicate that "MachineLearningModel1" should return four predicted quick replies with the highest confidence levels. The confidence-based mutation algorithm may (or may not) substitute in a quick reply based on an ordering of the quick replies that are returned from the machine learning model. The system may substitute in quick replies based on whether the given predicted quick replies' confidence exceeded a threshold value. The "max_replacements" tag may determine the maximum number of quick replies that would be substituted. For example, a "max_replacements" value of 1 would trigger a substitution of up to one quick reply (e.g., if one or more predicted quick replies is below the confidence threshold).

The configuration file may also include an identifier for a particular machine learning model or algorithm (e.g., "MachineLearningModel1" as shown in configuration file 400), which may allow the system to apply modifications to a particular machine learning model. The configuration file may also include an identifier for a dynamic conversational response which should be substituted in (e.g., "Example_QR1" as shown in configuration file 400).

The configuration file may also include an identifier for a criterion, which should be met prior to applying the configuration file. This property may specify any parameters that are necessary for the "mutation algorithm" to run. For example, these properties might indicate a particular piece of user data (e.g., demographic, cohort, etc.) that must be met.

Figure 6:
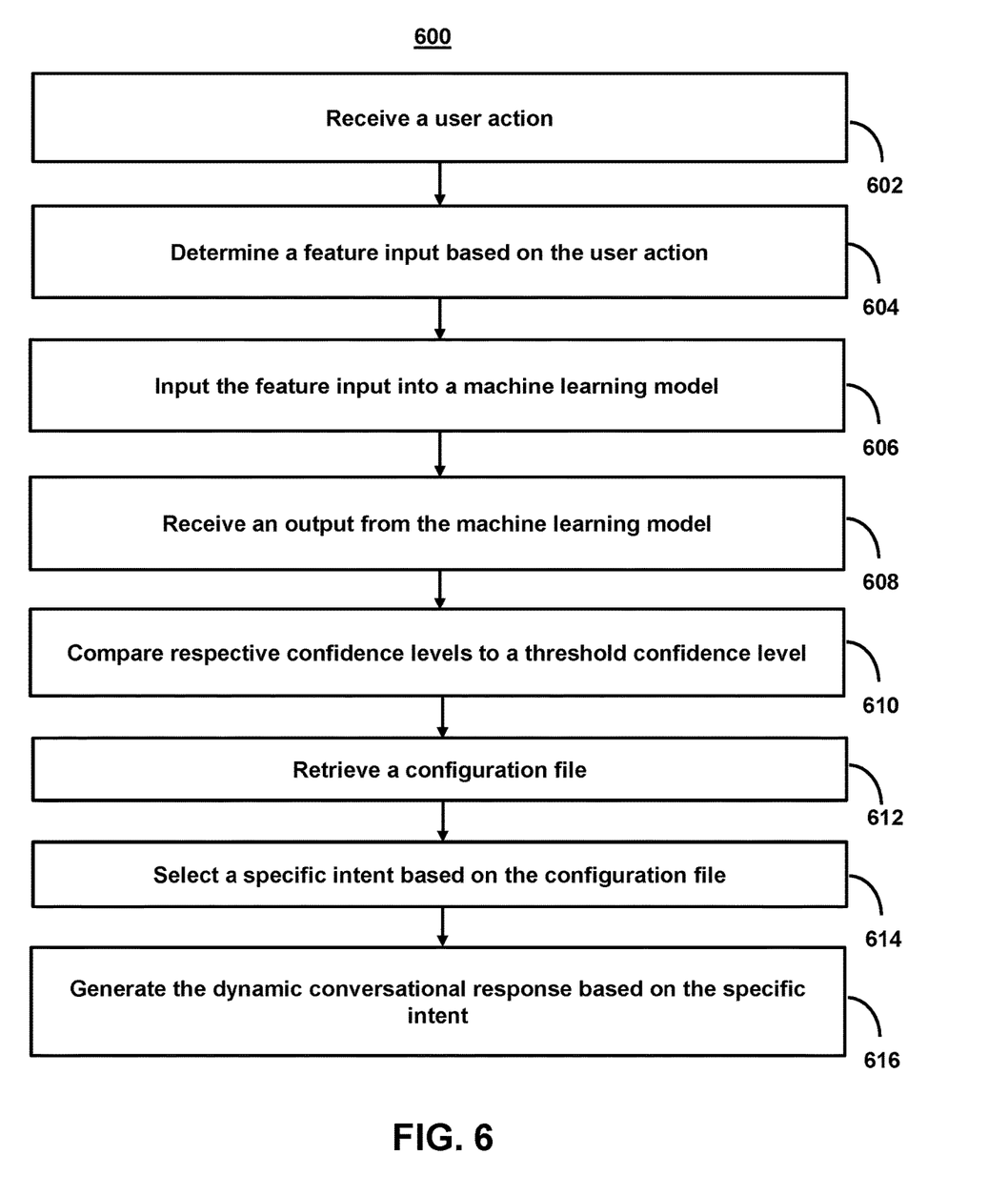
FIG. 6 shows a flowchart of the steps involved in dynamically updating machine learning models that provide conversational responses, in accordance with one or more embodiments.

For example, configuration file 400 may cause the system to execute a confidence-based substitution strategy (as further described in FIG. 6 herein). In such cases, the system may determine if the user meets a certain set of criteria. For this use case, the criterion may be a machine learning confidence value for the dynamic conversational responses generated for this user. If the confidence value for a given dynamic conversational response is lower than the predetermined threshold confidence level, then the user would be eligible for substitution. The threshold confidence level would be determined by performing an analysis on historical model results to determine how a certain confidence level maps to the likelihood of correctly predicting a user's intent. The system may use this mapping in a cost-benefit analysis against the potential business value of the substituted dynamic conversational response.

The system may perform a mutation on the list of dynamic conversational responses returned by a recommendation algorithm (e.g., a machine learning model). In this case, the dynamic conversational responses with confidence levels that fall below the threshold confidence level may be substituted with intents coming from the "quick replies" attribute in the configuration file.

The system may determine which dynamic conversational responses may serve as the substitute dynamic conversational response based on various characteristics. For example, the system may choose randomly from a list of "high-value" dynamic conversational responses. Additionally or alternatively, the system may select substituted dynamic conversational responses as a discovery service, where the substituted dynamic conversational response may correspond to an intent that the user has never seen before (e.g., an advertisement of a new product or feature). Similarly, the substituted dynamic conversational response may come from a list of dynamic conversational responses that more recently gained the ability to be answered or from a list of infrequently-shown dynamic conversational responses for which there are not yet sufficient accuracy metrics.

The system may return a mutated list to the machine learning model. In this case, the mutation algorithm may return the list of high-confidence dynamic conversational responses along with the dynamic conversational responses that were substituted in for the low-confidence dynamic conversational responses.

Figure 5:
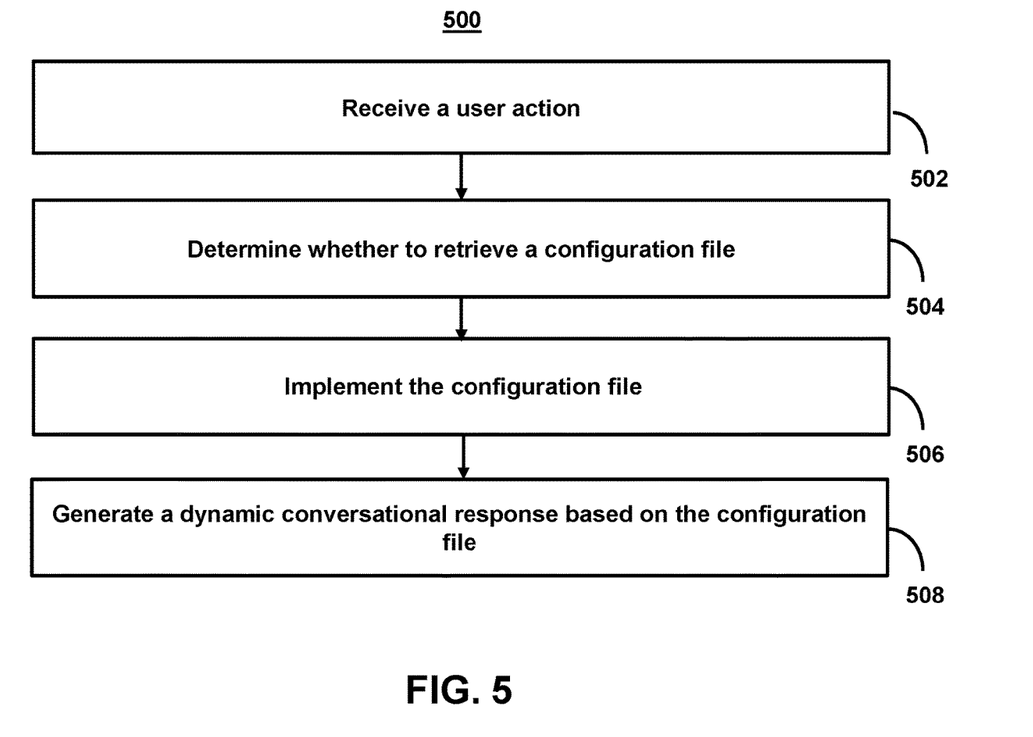
FIG. 5 shows a flowchart of the steps involved in generating dynamic conversational responses, in accordance with one or more embodiments.

FIG. 5 shows a flowchart of the steps involved in generating dynamic conversational responses, in accordance with one or more embodiments. For example, process 500 may represent the steps taken by one or more devices as shown in FIGS. 1-2 when generating dynamic conversational responses using two-tier machine learning models (e.g., as shown in FIG. 3).

At step 502, process 500 (e.g., using one or more components in system 200 (FIG. 2)) receives a user action. For example, the system may receive one or more user inputs to a user interface (e.g., user interface 100 (FIG. 1)). The system may determine a likely intent of the user in order to generate one or more dynamic conversational responses based on that intent. The user action may take various forms include speech commands, textual inputs, responses to system queries, and/or other user actions (e.g., logging into a mobile application of the system). In each case, the system may aggregate information about the user action, information about the user, and/or other circumstances related to the user action (e.g., time of day, previous user actions, current account settings, etc.) in order to determine a likely intent of the user.

At step 504, process 500 (e.g., using one or more components in system 200 (FIG. 2)) determines whether to retrieve a configuration file. For example, the system may determine if the user meets a certain set of criteria (e.g., criteria found in configuration file 400 (FIG. 4)). For example, these criteria could be based on attributes such as their account information, metadata from the dynamic conversational responses generated by the recommendation algorithm, and/or information around how they are interacting with the system.

For example, the system may compare a feature of a feature input (e.g., based on user data) to a configuration file criterion to determine whether or not to retrieve (and/or execute instructions of) a configuration file. The system may determine whether or not the feature matches the configuration file criterion. For example, the system may determine whether or not the user is part of a given cohort, whether respective confidence levels of generated dynamic conversational responses (e.g., dynamic conversational responses 102 (FIG. 1)) match a threshold confidence level (e.g., a minimum predetermined confidence level that may be indicative of a user's actual intent).

In some embodiments, the system may apply additional and/or alternative threshold for retrieving the configuration file. For example, the system may determine a total number of dynamic conversational responses shown at one time, over a certain period of time, and/or over a lifetime of a user's interaction with a device, devices, and/or application (e.g., over several device sessions). For example, the system may determine to retrieve a configuration file if more than a predetermined number of dynamic conversational responses may be shown simultaneously in a user interface. For example, the system may determine that five dynamic conversational responses are to be simultaneously shown. The system may determine three dynamic conversational responses based on one or more machine learning models (e.g., determining one or more intents of a user), and the system may populate two dynamic conversational responses based on other criteria (e.g., a business goal, a test feature, etc. In another example, the system may determine that fifty dynamic conversational responses have been shown during the present week, over the lifetime of the application, during a given device session(s). The system may determine that fifty dynamic conversational responses displayed corresponds to a threshold for updating dynamic conversational responses. In response, the system may retrieve a configuration file and modify one or more dynamic conversational responses. For example, the system may base on one or more dynamic conversational responses on machine learning models (e.g., determining one or more intents of a user), and the system may populate other dynamic conversational responses based on the configuration file.

Additionally or alternatively, the system may use a configuration file retrieval scheme that allows the system to draw dynamic conversational responses from different dimensions in addition to the one or more machine learning models that are based on user intent. For instance, out of five dynamic conversational response openings (e.g., user interface positions reserved for dynamic conversational responses), the system may determine two dynamic conversational responses based on one or more alternative machine learning models (e.g., one or more machine learning models for generating dynamic conversational responses using in a relevant dimension that may be based on factors other than user intent). For example, the system may determine one dynamic conversational response for testing or feedback data collection, one dynamic conversational response for advertisement purpose, and one dynamic conversational response for unexpectedness or novelty. The system may generate scores (e.g., confidence levels are described herein that indicate a user's responsiveness to dynamic conversational responses based on machine learning models in other dimensions). The system may compare the scores to each other and/or threshold corresponding to each dimension and/or a predetermined number as discussed herein to select machine learning models for using to generate future dynamic conversational responses and/or determining when to retrieve a configuration file (e.g., featuring additional updates to the dynamic conversational responses, categories corresponding to the dynamic conversational responses, and/or machine learning models used to select the dynamic conversational responses).

At step 506, process 500 (e.g., using one or more components in system 200 (FIG. 2)) implements the configuration file. For example, the system may perform a mutation on a list of dynamic conversational responses (e.g., dynamic conversational responses 104 (FIG. 1)) returned by a recommendation algorithm (e.g., a machine learning model). This mutation may involve inserting a dynamic conversational response, substituting a generated dynamic conversational response with a new dynamic conversational response, and/or changing the ordering of the generated dynamic conversational responses. For example, the system may determine any new dynamic conversational responses that would be added or substituted would be pulled from the "quick replies" property defined in configuration file 400 (FIG. 4)).

For example, the configuration file may include a modification to rules used to select specific intents. For example, the rules may cause the substitution of one of a plurality of specific intents of a machine learning model with a specific intent from the configuration file. Alternatively or additionally, the modification may comprise modifying an order of dynamic conversational responses during the conversational interaction. Alternatively or additionally, the modification may comprise adding a new specific intent and/or a dynamic conversational response based on a specific intent (e.g., a predetermined specific intent that is not based on the feature input).

At step 508, process 500 (e.g., using one or more components in system 200 (FIG. 2)) generates a dynamic conversational response based on the configuration file. For example, the system may generate a dynamic conversational response (e.g., dynamic conversational response 104 (FIG. 1)) and present the response in a user interface (e.g., user interface 150 (FIG. 1)). The response may appear with one or more likely responses (e.g., as shown in FIG. 1)). In some embodiments, the system may receive a user action selecting (or not selecting) a response (e.g., conversational response 102 (FIG. 1)) from a user interface.

For example, the system may return a mutated list of dynamic conversational responses (e.g., dynamic conversational responses 104 (FIG. 1)). If the user did not meet the criteria specified in the configuration file, the original list generated by the recommendation algorithm (e.g., dynamic conversational responses 102 (FIG. 1)) may be generated for display in a user interface.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-2 could be used to perform one of more of the steps in FIG. 5.

FIG. 6 shows a flowchart of the steps involved in dynamically updating machine learning models that provide conversational responses, in accordance with one or more embodiments. For example, process 600 may represent the steps taken by one or more devices as shown in FIGS. 1-3 when in generating dynamic conversational responses. For example, process 600 may be an example of a confidence-based dynamic conversational response substitution strategy. For example, when a machine learning model generates dynamic conversational response, those dynamic conversational response come with a certain "confidence" value in their metadata. The system may substitute in dynamic conversational response when the machine learning model has low confidence in one of its predictions. For example, the machine learning model's last prediction might have a low confidence number, so in that case the system may remove that last prediction and instead insert a new dynamic conversational response. The system may thus drive additional user interaction with these substituted dynamic conversational responses while having minimal impact on overall prediction accuracy. The decision of which dynamic conversational responses may be substituted (and what substitute dynamic conversational responses are used) may be based on any variety of factors, such as the dynamic conversational response's business value, its value for testing new features, and/or its ability to provide additional user interaction.

At step 602, process 600 (e.g., using one or more components in system 200 (FIG. 2)) receives a user action. For example, the system may receive a first user action during a conversational interaction with a user interface as shown in FIG. 1. The conversational interaction may comprise a user inquiry regarding an account of the user and/or may include one or more user actions.

At step 604, process 600 (e.g., using one or more components in system 200 (FIG. 2)) determines a feature input based on the user action. For example, the system may determine, using control circuitry, a first feature input based on the first user action in response to receiving the first user action. The system may generate the feature input based on one or more criteria. For example, the system may generate the feature input based on a conversational detail or information from a user account of the user, a time at which the user interface was launched, and/or a webpage from which the user interface was launched.

At step 606, process 600 (e.g., using one or more components in system 200 (FIG. 2)) inputs the feature input into a machine learning model. For example, the system may input the feature input into a machine learning model, wherein the machine learning model may be trained to determine respective confidence levels for a plurality of specific intents, and wherein each of the respective confidence levels indicates a likelihood that a user has a corresponding specific intent. In some embodiments, the system may receive a first labeled feature input, wherein the first labeled feature input may be labeled with a known specific intent (or confidence level for the known specific intent) for the first labeled feature input. The system may train the first machine learning model to classify the first labeled feature input with the known specific intent. In some embodiments, the first machine learning model may be a supervised machine learning model and/or a factorization machine model.

At step 608, process 600 (e.g., using one or more components in system 200 (FIG. 2)) receives an output from the machine learning model. For example, the system may receive, an output from the machine learning model, the output comprising the respective confidence levels for each of the plurality of specific intents.

At step 610, process 600 (e.g., using one or more components in system 200 (FIG. 2)) compares respective confidence levels to a threshold confidence level. For example, the system may compare each of the respective confidence levels to a threshold confidence level.

In some embodiments, the system may receive a second user action during the conversational interaction with the user interface. The system may determine a second feature input for the first machine learning model based on the second user action in response to receiving the second user action. The system may input the second feature input into the machine learning model. The system may receive a different output from the machine learning model.

At step 612, process 600 (e.g., using one or more components in system 200 (FIG. 2)) retrieves a configuration file. For example, the system may retrieve a configuration file based on comparing each of the respective confidence levels to a threshold confidence level, wherein the configuration file comprises a modification to rules used to select specific intents. For example, the criteria for retrieving a configuration file (e.g., as described in FIG. 4) may have been met, and in response, the system may have retrieved the configuration file.

In some embodiments, retrieving the configuration file based on comparing each of the respective confidence levels to the threshold confidence level may further comprise determining a predetermined number of specific intents of the plurality of specific intents have corresponding respective confidence levels below the threshold confidence level. For example, the system may determine that only two specific intents are associated with a threshold confidence level (e.g., indicating that the use may have this intent). The system may retrieve a substitute specific intent from the configuration file based on determining that the predetermined number of specific intents of the plurality of specific intents have corresponding respective confidence levels below the threshold confidence level, wherein selecting the dynamic conversational response based on the configuration file comprises selecting the substitute specific intent. For example, in response to determining that only two of the specific intents are likely to be actual intents of the user (e.g., based on exceeding the threshold confidence level), the system may retrieve substitute dynamic conversational responses. These substitute dynamic conversational responses may represent new and/or different specific intents or may not be related to a specific intent of the user. For example, the system may replace specific intents that are unlikely to be indicative of the user's actual intent (e.g., have a confidence level below a threshold confidence level) with dynamic conversational responses related to other goals (e.g., an advertisement, etc.).

In some embodiments, retrieving the configuration file based on comparing each of the respective confidence levels to the threshold confidence level may further comprises determining a subset of predicted specific intents (e.g., determining a top five most likely intents). The system may determine that a confidence level of a predicted specific intent of the subset of predicted specific intents is below the threshold confidence level (e.g., despite this specific intent being in the top five most likely it is still unlikely to be indicative of the user's actual intent). The system may retrieve a substitute specific intent from the configuration file based on determining that the confidence level of the predicted specific intent of the subset of predicted specific intents is below the threshold confidence level, wherein selecting the dynamic conversational response based on the configuration file comprises selecting the substitute specific intent. For example, in response to determine that some specific intents are unlikely to match a user's actual intent, the system may replace these specific intents with advertisements or dynamic conversational responses associated with other business goals.

At step 614, process 600 (e.g., using one or more components in system 200 (FIG. 2)) selects a specific intent based on the configuration file. For example, the system may select a specific intent based on the configuration file, wherein the specific intent corresponds to a dynamic conversational response. For example, the system may have one or more potential responses and select one or more of these responses based on the specific intent of the user indicated by the configuration file.

At step 616, process 600 (e.g., using one or more components in system 200 (FIG. 2)) generates the dynamic conversational response. For example, the system may generate, at the user interface, the dynamic conversational response during the conversational interaction (e.g., as shown in FIG. 1). The generated dynamic conversational response may be provided during an user session, such as described with respect to FIG. 1 herein.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-2 could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described herein may be applied to, or used in accordance with, other systems and/or methods.

The present techniques will be better understood with reference to the following enumerated embodiments:

1. A method, the method comprising: receiving a user action; determining whether to retrieve a configuration file; retrieve the configuration file; and generate a dynamic conversational response based on the configuration file.

2. A method for dynamically updating machine learning models that provide conversational responses, the method comprising: receiving, using control circuitry, a user action, at a user interface, during a conversational interaction with a user interface; determining, using the control circuitry, a feature input based on the user action in response to receiving the user action; inputting, using the control circuitry, the feature input into a machine learning model, wherein the machine learning model is trained to determine respective confidence levels for a plurality of specific intents, and wherein each of the respective confidence levels indicates a likelihood that a user has a corresponding specific intent; receiving, using the control circuitry, an output from the machine learning model, the output comprising the respective confidence levels for each of the plurality of specific intents; comparing, using the control circuitry, each of the respective confidence levels to a threshold confidence level; based on comparing each of the respective confidence levels to a threshold confidence level, retrieving, using the control circuitry, a configuration file, wherein the configuration file comprises a modification to rules used to select specific intents; and selecting, using the control circuitry, a specific intent based on the configuration file, wherein the specific intent corresponds to a dynamic conversational response; and generating for display, at the user interface, the dynamic conversational response during the conversational interaction.

3. The method of any of the preceding embodiments, wherein retrieving the configuration file based on comparing each of the respective confidence levels to the threshold confidence level further comprises: determining a predetermined number of specific intents of the plurality of specific intents have corresponding respective confidence levels below the threshold confidence level; and retrieving a substitute specific intent from the configuration file based on determining that the predetermined number of specific intents of the plurality of specific intents have corresponding respective confidence levels below the threshold confidence level, wherein selecting the dynamic conversational response based on the configuration file comprises selecting the substitute specific intent.

4. The method of any of the preceding embodiments, wherein retrieving the configuration file based on comparing each of the respective confidence levels to the threshold confidence level further comprises: determining a subset of predicted specific intents; determining that a confidence level of a predicted specific intent of the subset of predicted specific intents is below the threshold confidence level; and retrieving a substitute specific intent from the configuration file based on determining that the confidence level of the predicted specific intent of the subset of predicted specific intents is below the threshold confidence level, wherein selecting the dynamic conversational response based on the configuration file comprises selecting the substitute specific intent.

5. The method of any of the preceding embodiments, wherein retrieving the configuration file is further based on: comparing a feature of the feature input to a configuration file criterion; determining that the feature matches the configuration file criterion; and determining to retrieve the configuration file based on comparing each of the respective confidence levels to the threshold confidence level and based on the feature matching the configuration file criterion.

6. The method of any of the preceding embodiments, wherein the modification to rules used to select dynamic conversational responses comprises substituting one of the plurality of specific intents with the specific intent.

7. The method of any of the preceding embodiments, wherein the modification to rules used to select dynamic conversational responses further comprises modifying an order of dynamic conversational responses during the conversational interaction.

8. The method of any of the preceding embodiments, wherein the modification to rules used to select dynamic conversational responses further comprises additional specific intents to add to the plurality of specific intents.

9. The method of any of the preceding embodiments, further comprising: receiving a labeled feature input, wherein the first labeled feature input is labeled with a known confidence level for a labeled specific intent for the labeled feature input; and training the machine learning model to classify the labeled feature input with the known confidence level for the labeled specific intent.

10. The method of any of the preceding embodiments, wherein selecting the specific intent based on the configuration file, comprises selecting a predetermined specific intent that is not based on the feature input.

11. The method of any of the preceding embodiments, wherein the feature input includes a conversational detail, indicates information from a user account of the user, indicates a time at which the user interface was launched, or indicates a webpage from which the user interface was launched.

12. A tangible, non-transitory, machine-readable medium storing instructions that, when executed by a data processing apparatus, cause the data processing apparatus to perform operations comprising those of any of embodiments 1-10.

13. A system comprising: one or more processors; and memory storing instructions that, when executed by the processors, cause the processors to effectuate operations comprising those of any of embodiments 1-10.

14. A system comprising means for performing any of embodiments 1-10.

What is claimed is:

1. A non-transitory computer-readable medium for dynamically updating machine learning models that provide conversational responses comprising of instructions that, when executed by one or more processors, cause operations comprising: receiving a user action, at a user interface, during a conversational interaction with a user interface;
determining, based on the user action, an output from a model, wherein the model is trained to determine respective confidence levels for a plurality of specific intents, wherein each of the respective confidence levels indicates a respective likelihood that a user has a corresponding specific intent, and wherein the output comprises the respective confidence levels for the plurality of specific intents;
determining that a confidence level of a specific intent of the plurality of specific intents is below a threshold confidence level;
retrieving a substitute specific intent from a configuration file based on determining that the confidence level of the specific intent is below the threshold confidence level, wherein the configuration file comprises a mutation algorithm for the machine learning model that introduces a modification to rules of the machine learning model used to select specific intents;
selecting the substitute specific intent from the configuration file, wherein the substitute specific intent corresponds to a dynamic conversational response; and
generating for display, at the user interface, the dynamic conversational response during the conversational interaction.

2. A method for dynamically updating machine learning models that provide conversational responses, the method comprising:
receiving an output from a machine learning model, wherein the machine learning model is trained to determine respective confidence levels for a plurality of specific intents, wherein each of the respective confidence levels indicates a respective likelihood that a user has a corresponding specific intent, and wherein the output comprises the respective confidence levels for the plurality of specific intents;
determining that a confidence level of a specific intent of the plurality of specific intents is below a threshold confidence level;
retrieving a substitute specific intent from a configuration file based on determining that the confidence level of the specific intent is below the threshold confidence level, wherein the configuration file comprises a mutation algorithm for the machine learning model that introduces a modification to rules of the machine learning model used to select specific intents;
selecting the substitute specific intent from the configuration file, wherein the substitute specific intent corresponds to a dynamic conversational response; and
generating for display, at a user interface, the dynamic conversational response during a conversational interaction.

3. The method of claim 2, further comprising retrieving the configuration file based on determining that the confidence level of the specific intent of the plurality of specific intents is below the threshold confidence level.

4. The method of claim 2, wherein retrieving the configuration file further comprises:
determining a user cohort of the user;
determining a recommendation engine based on the user cohort; and
selecting the configuration file based on the recommendation engine.

5. The method of claim 2, wherein retrieving the configuration file further comprises:
retrieving a plurality of configuration files; and
selecting the configuration file from the plurality of configuration files.

6. The method of claim 2, wherein retrieving the configuration file further comprises:
performing a series of queries to determine a current recommendation engine; and selecting the configuration file based on the series of queries.

7. The method of claim 2, wherein retrieving the configuration file further comprises:
    determining a predetermined number of specific intents of the plurality of specific intents have corresponding respective confidence levels below the threshold confidence level; and
    retrieving a substitute specific intent from the configuration file based on determining that the predetermined number of specific intents of the plurality of specific intents have corresponding respective confidence levels below the threshold confidence level, wherein selecting the dynamic conversational response based on the configuration file comprises selecting the substitute specific intent.

8. The method of claim 2, wherein retrieving the output further comprises:
    receiving a user action, at a user interface, during a conversational interaction with a user interface; and
    determining, based on the user action, the output from a machine learning model.

9. The method of claim 2, wherein retrieving the configuration file is based on:
    comparing a feature of a feature input for the machine learning model to a configuration file criterion;
    determining that the feature matches the configuration file criterion; and
    determining to retrieve the configuration file based on comparing each of the respective confidence levels to the threshold confidence level and based on the feature matching the configuration file criterion.

10. The method of claim 2, wherein the mutation algorithm further introduces a modification to rules used to select dynamic conversational responses.

11. The method of claim 10, wherein the modification to rules used to select dynamic conversational responses comprises modifying an order of dynamic conversational responses during the conversational interaction.

12. The method of claim 10, wherein the modification to rules used to select dynamic conversational responses comprises additional specific intents to add to the plurality of specific intents.

13. The method of claim 2, further comprising:
    receiving a labeled feature input, wherein the labeled feature input is labeled with a known confidence level for a labeled specific intent for the labeled feature input; and
    training the machine learning model to classify the labeled feature input with the known confidence level for the labeled specific intent.

14. The method of claim 2, wherein the configuration file comprises a predetermined specific intent that is not based on a feature input of the machine learning model.

15. The method of claim 14, wherein the feature input includes a conversational detail, indicates information from a user account of the user, indicates a time at which the user interface was launched, or indicates a webpage from which the user interface was launched.

16. A non-transitory computer-readable medium comprising instructions that, when executed by one or more processors, cause operations comprising:
    receiving an output from a model, wherein the model is trained to determine respective confidence levels for a plurality of specific intents, wherein each of the respective confidence levels indicates a respective likelihood that a user has a corresponding specific intent, and wherein the output comprises the respective confidence levels for the plurality of specific intents;
    determining that a confidence level of a specific intent of the plurality of specific intents is below a threshold confidence level;
    retrieving a substitute specific intent from a configuration file based on determining that the confidence level of the specific intent is below the threshold confidence level, wherein the configuration file comprises a mutation algorithm for the machine learning model that introduces a modification to rules of the machine learning model used to select specific intents;
    selecting the substitute specific intent from the configuration file, wherein the substitute specific intent corresponds to a dynamic conversational response; and
    generating for display the dynamic conversational response.

17. The non-transitory computer-readable medium of claim 16, wherein the instructions further cause operations comprising retrieving the configuration file based on determining that the confidence level of the specific intent of the plurality of specific intents is below the threshold confidence level.

18. The non-transitory computer-readable medium of claim 16, wherein retrieving the configuration file further comprises:
    determining a user cohort of the user;
    determining a recommendation engine based on the user cohort; and
    selecting the configuration file based on the recommendation engine.

19. The non-transitory computer-readable medium of claim 16, wherein retrieving the configuration file further comprises:
    retrieving a plurality of configuration files; and
    selecting the configuration file from the plurality of configuration files.

20. The non-transitory computer-readable medium of claim 16, wherein retrieving the configuration file further comprises:
    performing a series of queries to determine a current recommendation engine; and
    selecting the configuration file based on the series of queries.

* * * * *